United States Patent [19]

Laukhuf

[11] Patent Number: 4,914,863
[45] Date of Patent: Apr. 10, 1990

[54] TRUCK CAB DOOR SYSTEM FOR IMPROVED RIGHT SIDE VISION

[75] Inventor: Rodney A. Laukhuf, Haviland, Ohio

[73] Assignee: Navistar International Transportation Corp., Chicago, Ill.

[21] Appl. No.: 340,304

[22] Filed: Apr. 19, 1989

[51] Int. Cl.$^4$ ................................................ B60J 5/04
[52] U.S. Cl. ....................................... 49/502; 49/349; 49/352; 296/146; 296/201
[58] Field of Search .......................... 49/502, 352, 349; 296/146, 201

[56] References Cited

U.S. PATENT DOCUMENTS

| | | | |
|---|---|---|---|
| 4,416,089 | 11/1983 | Lambke, Jr. .......................... | 49/502 |
| 4,644,699 | 2/1987 | Chandler et al. ..................... | 49/502 |
| 4,652,043 | 3/1987 | Hurlburt .......................... | 296/146 X |
| 4,788,795 | 12/1988 | Pinsonneault .................... | 49/502 X |

OTHER PUBLICATIONS

"90-Micro" Metalurgica Micro Ltda.
"Cable Systems and Controls" HI-Lex Corporation, pp. 1, 2, 6.
"Isuzu 810" Isuzu Motors, Inc.

*Primary Examiner*—Philip C. Kannan
*Attorney, Agent, or Firm*—F. David AuBuchon; Dennis K. Sullivan

[57] ABSTRACT

A truck cab door system for increased right side viewing area includes a truck cab door having an inner skin panel and an outer skin panel spaced apart but joined together along the end edges thereof. A relatively large opening in an upper portion of the door skin panels provides a field of vision through a correspondingly dimensioned glass panel of a dropping glass window assembly received between the skin panels and within and closing off the opening when in a raised position thereof. A mechanism for causing selective dropping or raising of the glass panel of the dropping glass window assembly is operatively engaged to a mechanism for supporting the glass panel. A second, comparatively large opening is provided in a lower portion of each door skin panel with a viewing window assembly including a window panel fixed within the second opening of the outer skin panel and a clear panel removably mounted over the second opening of the inner skin panel. The glass panel of the dropping window assembly passes between the fixed window panel and the clear panel when in a dropped position thereof. The mechanism for causing dropping or raising of the glass panel of the dropping glass window assembly is positioned between the inner and outer door skin panels at a location adjacent the large lower opening and is substantially hidden from view through the viewing window assembly. The mechanism for supporting the glass panel is engaged to and extends away from the mechanism for causing dropping and raising of the glass panel and under half of the glass panel to a point of attachment thereto and is of diminutive dimension relative to the large second opening in the inner and outer skin panels.

10 Claims, 3 Drawing Sheets

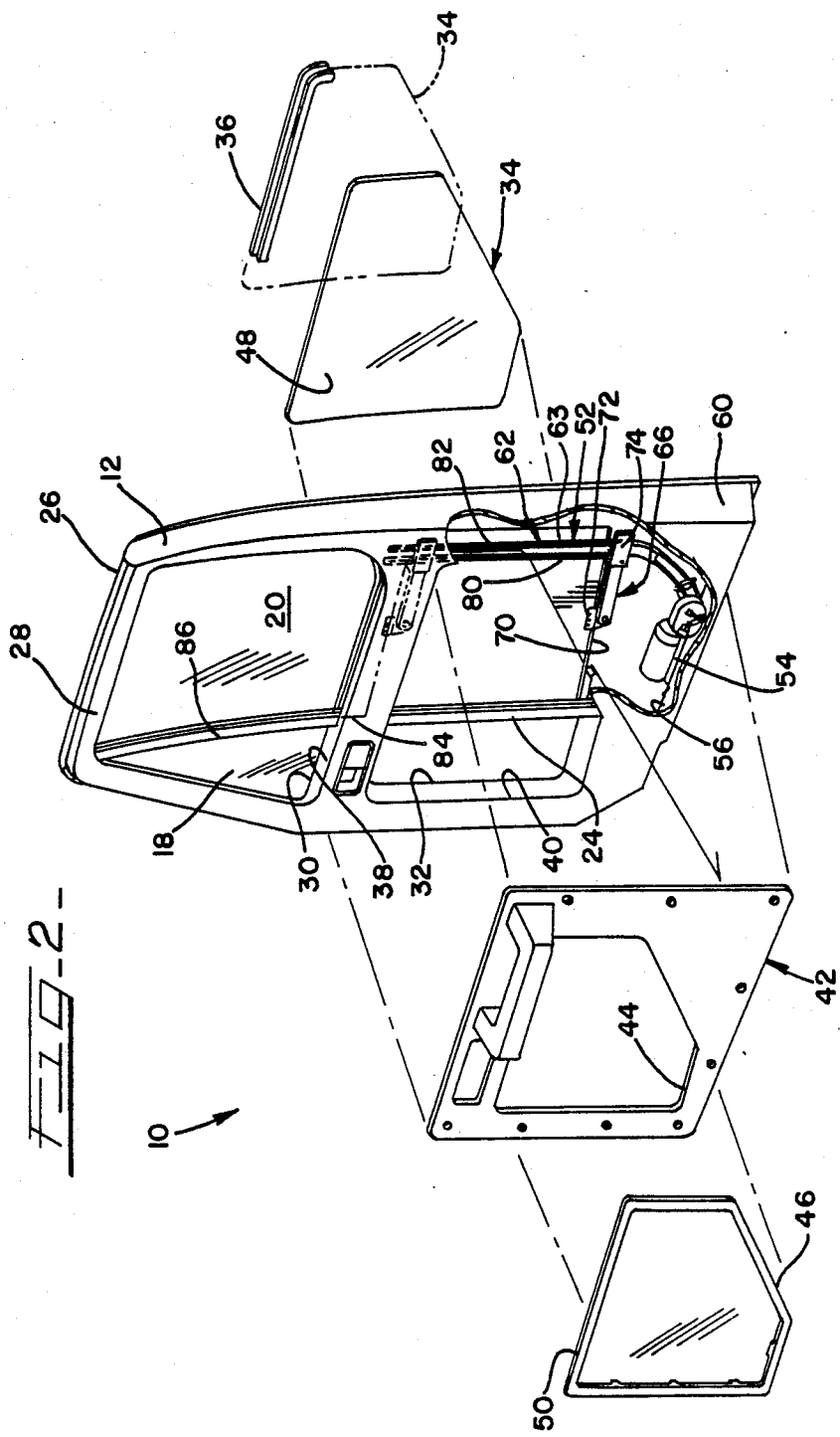

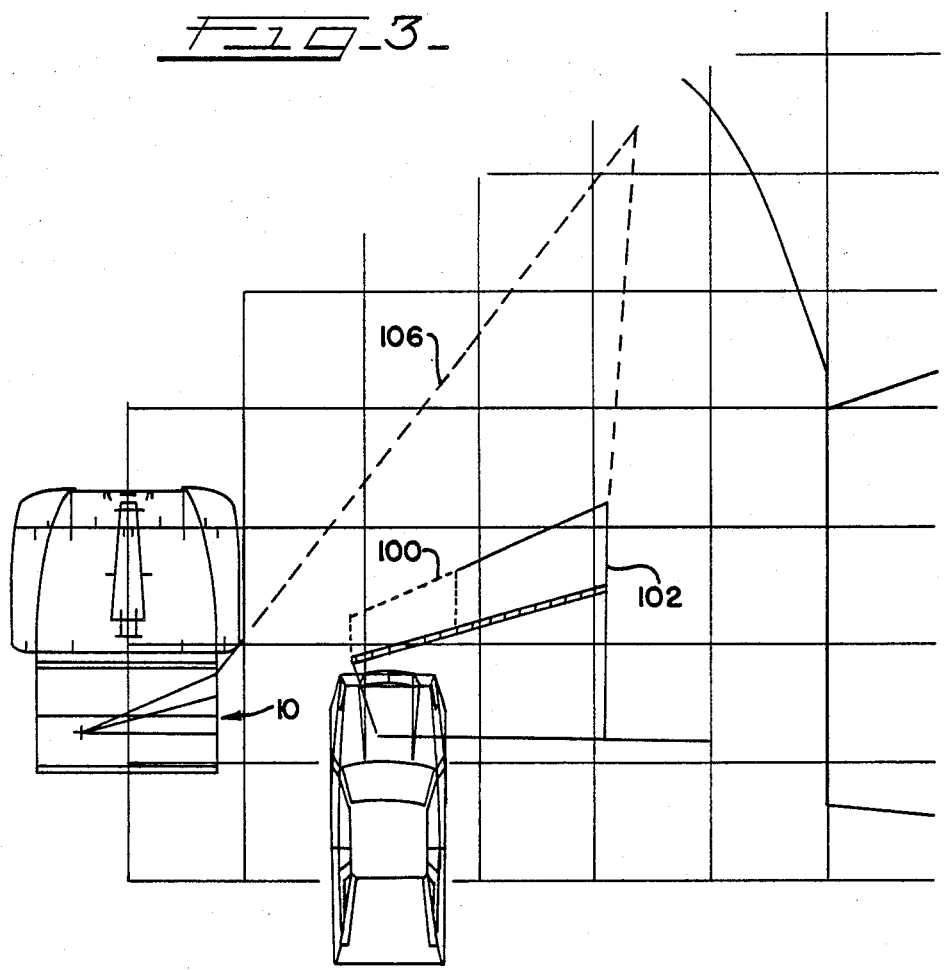

TRUCK CAB DOOR SYSTEM FOR IMPROVED RIGHT SIDE VISION

BACKGROUND OF THE INVENTION

This invention relates to a truck cab door system which provides improved right side vision for the driver. More particularly, the invention relates to a truck cab door system which includes an upper traditional dropping glass window and a lower, large viewing window, the view through which remains unhampered by the dropping window, regardless of whether the window is open or closed.

DESCRIPTION OF THE PRIOR ART

Due to the high cab location and driver position in most highway tractors, the ability of the driver to see smaller vehicles, motorcycles, or pedestrians along the right side of the vehicle may be quite limited. In the past, attempts have been made to reduce the "blind" area along the right side of the vehicle with the addition of convex spot mirrors, fresnel lenses, and other viewing devices. Although these indirect vision devices have increased the viewing area, they have not been as effective as direct vision. They provide the driver with an image of the object, but can frustrate him with regard to the location of the object, due to the dimensional distortion of the field of view. This is evidenced by the right side convex mirrors on passenger cars.

Small port windows have also been provided along a forward lower edge on many truck doors. Their field of view, however, is so small that smaller objects may not coincide with the field of vision obtained therethrough. Increasing the size of the port window, such as by providing a larger, lower viewing window assembly in place thereof, and thereby increasing the field of view has not been achieved in the U.S. truck market because of the desire to maintain the roll down (dropping glass) window which is very popular. Presently available dropping glass window hardware (window run channels, regulator, crank, etc.) would interfere with the view through such a large lower viewing window assembly.

Large lower viewing windows, however, are presently used on Japanese trucks. This has been accomplished by replacing the dropping glass window with a slider window which typically includes two vertical half sections, a forward half-section of which slides rearwardly over the other. Such slider windows have not been widely used in the U.S. due to the preference for windows which have full opening capability.

As will be described in greater detail hereinafter, the door system of the present invention offers a fixed large lower viewing window assembly along with a dropping glass window for greatly enhanced right side visibility.

SUMMARY OF THE INVENTION

According to the invention, there is provided a truck cab door system for increased right side viewing area which includes a truck cab door having an inner skin panel and an outer skin panel spaced apart but joined together along the end edges thereof. A relatively large opening in an upper portion of the door skin panels provides a field of vision through a correspondingly dimensioned glass panel of a dropping glass window assembly received between the skin panels and within and closing off the opening when in a raised position thereof. A mechanism for causing selective dropping or raising of the glass panel of the dropping glass window assembly is operatively engaged to a mechanism for supporting the glass panel. A second, comparatively large opening is provided in a lower portion of each door skin panel with a viewing window assembly including a window panel fixed within the second opening of the outer skin panel and a clear panel removably mounted over the second opening of the inner skin panel. The glass panel of the dropping window assembly passes between the fixed window panel and the clear panel when in a dropped position thereof. The mechanism for causing dropping or raising of the glass panel of the dropping glass window assembly is positioned between the inner and outer door skin panels at a location adjacent the large lower opening and is substantially hidden from view through the viewing window assembly. The mechanism for supporting the glass panel is engaged to and extends away from the mechanism for causing dropping and raising of the glass panel and under half of the glass panel to a point of attachment thereto and is of diminutive dimension relative to the large second opening in the inner and outer skin panels.

BRIEF DESCRIPTION OF THE DRAWINGS

FIG. 2 is an exploded perspective view of the door system of the present invention and shows the arrangement of the system components thereof.

FIG. 3 a graphic illustration comparing the enhanced right side field of vision provided by the door system of the present invention to that available in existing door systems used in the United States today.

DESCRIPTION OF THE PREFERRED EMBODIMENT

Figure 1:
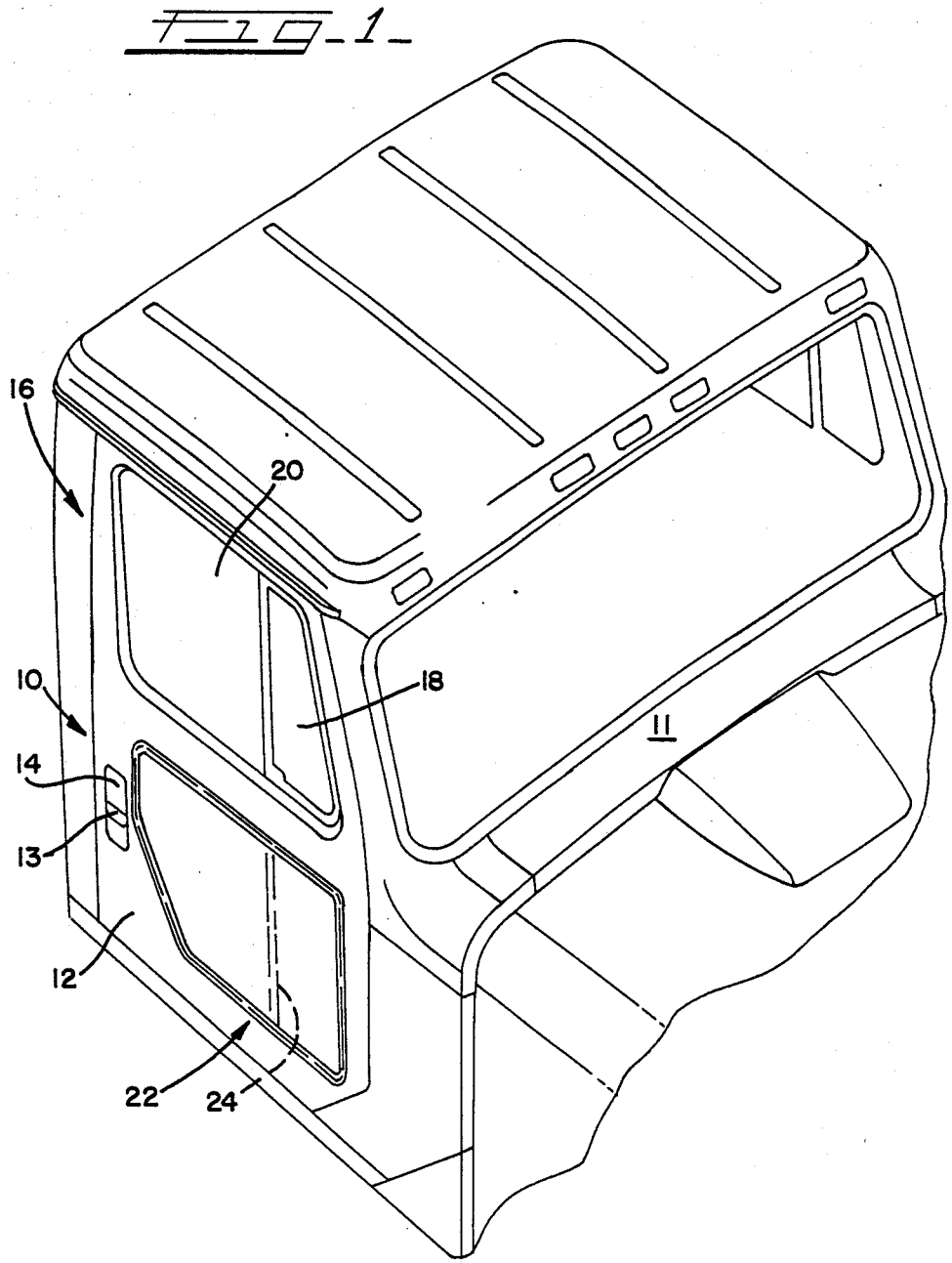
FIG. 1 is a perspective view of a door system made in accordance with the teachings of the present invention mounted on the right side of the truck cab.

Referring now to the drawings in greater detail, there is illustrated in FIG. 1 a door system 10, constructed according to the teachings of the present invention, mounted on the right side of a truck cab 11.

As shown, the door system 10 includes a cab door 12 mounting a handle 13 and locking device 14, and a split upper window assembly 16. A vent window 18 of the split window assembly 16 is pivotally movable to direct air moving along the side of the cab 11 into the cab 11 when the truck is moving forwardly. The split window assembly 16 also includes a dropping glass window 20 located directly rearwardly of the vent window 18. This dropping glass window 20, as will be described in greater detail hereinafter, may be moved from a fully closed (raised) position to a fully open (dropped) position, or may be positioned anywhere between these two extremes and held there.

The door system 10 further includes a large lower viewing window assembly 22 located beneath the split window assembly 16 and, as will be described below, the view therethrough remains unhampered regardless of whether the dropping glass window 20 thereabove is open or closed. A lower portion of a vertical forward run channel 24 within the door frame 12 for guiding the dropping glass window 20 may be seen through the viewing window assembly 22.

Turning now to FIG. 2, the door system 10 is seen to include a truck cab door 12 comprising an outer skin panel 26 and an inner skin panel 28 which is shown partly broken away, the panels 26 and 28 being joined together along the edges thereof in a known manner.

The outer skin panel 26 includes a conventional window opening 30 plus a large lower viewing window opening 32 sized and configured to receive therein a glass window panel 34 of predetermined dimension. This glass window panel 34 may be fixed within the viewing window opening 32 with a molded rubber seal partially shown at 36 in a known manner or may be bonded to the outer skin panel 26, to form a modular viewing window assembly 22.

The inner skin panel 28 has a conventional window opening 38 therein. Below the window opening 38 is a lower viewing window opening 40 which is similar in size and shape to the lower viewing window opening 32 in the outer skin panel 26. This lower window opening 40 in the inner skin panel 28 allows for visibility from the inside of the cab 11 through the window panel 34 mounted to the outer skin panel 26 and also allows for access to interior door hardware contained between the inner skin panel 28 and the outer skin panel 26, as will be defined hereinafter.

The inner skin panel 28 then may be covered with an interior trim panel 42 which includes a window opening 44 therein. The window opening 44 is sized and configured to be similar to the viewing window opening 40 in the inner skin panel 28. A removable interior window panel 46, which may be made of a clear plastic or other such suitable material, is provided and is fixed to the interior trim panel 42 in a removable manner, such as by snap-fit engagement thereto.

The provision of such removable window panel 46 provides a means of access to the interior door hardware defined below and to the inwardly disposed surface 48 of the glass panel 34 fixed to the outer skin panel 26 for cleaning thereof, as well as for access to an outwardly disposed surface 50 of the removable window panel 46 for the cleaning thereof.

Turning now to the interior door hardware mentioned above, it will be seen that the gear and sector window regulator, together with the window crank therefor, conventionally used with such a dropping glass window 20, have been replaced with a tape or cable drive regulator 52 which is driven by a reversible drive motor 54. To optimize the size of the viewing window assembly 22, the drive motor 54 is strategically mounted to a lower ledge or wall 56 of the door 12 between the inner and outer skin panels 26 and 28 and is located toward the swing end 60 of the door 12. The motor 54 is reversible and is engaged by suitable means to a circuitous cable or tape drive 62 forming part of the window regulator 52 in a manner to cause lowering of the dropping glass window 20, which is attached to the cable or tape drive 62 by a window lift arm or flange 66, when the motor 54 is operated in one direction. Alternatively, when the motor 54 is operated in the other direction, the dropping glass window 20 is raised by the cable drive 62 and support flange 66.

The lowering of the dropping glass window 20 places it in its lowermost position between the window panels 34 and 46 of the viewing window assembly 22.

The compact support structure disclosed above, including the support flange 66, is proposed for use with the dropping glass window 20 to produce a virtually obstacle-free view through the viewing window assembly 22.

The dropping glass window 20, at a center point along a bottom end edge 70 thereof, has a clip 72 fixed thereto. The clip 72 engages one end of the lift arm 66 which extends from the clip 72 toward the rear or swing edge 60 of the door 12 where the other end of the lift arm 66 terminates in engagement with a mounting clamp 74 which is connected in suitable manner to the cable drive 62. The mounting clamp 74 is attached to the traveling cable or tape 63 and travels upwardly or downwardly with the cable or tape as it is driven by the electric motor 54. The clamp 74 is guided by the support flange 80. As the clamp 74 moves up or down, it raises or lowers the lift arm 66 which in turn raises or lowers the dropping glass 20.

When the window 20 is in the lowermost position thereof, the dropping glass window 20 is positioned between the fixed outer viewing window panel 34 and the removable inner panel 46. Since the cable drive 62 is situated toward the swing edge 60 of the door 12, within the inner and outer skin panels 26 and 28, the major portion of the window hardware is hidden from view through the viewing window assembly 22.

The lift arm 66 and clip 72, on the other hand, may be visible through the viewing window assembly 20 when the dropping glass window 20 is at certain intermediate dropped positions thereof and, to minimize obstruction of the view through the viewing window assembly 22 by these structures, they have been designed to be of small dimensions to cause only a small amount of interference with the view through the viewing window assembly 22.

The conventional dropping window 20 is also supported at a forward end 84 thereof within the run channel 24 which runs from the lower ledge 56 of the door 12 upwardly, and forms a dividing member 86 between the vent window 18 and the dropping glass window 20 along its upper half. The forward run channel 24, a lower portion of which is seen running vertically through the viewing window assembly 22, only blocks the view therethrough within a very narrow vertical area, rendering the interference with the view through the viewing window assembly 22 almost negligible.

Turning now to FIG. 3, there is illustrated therein a graphic representation of the increase in the right side field of vision afforded by the truck door system 10 of the present invention incorporating the viewing window assembly 22 of the present invention as described above.

The field of view provided through the small forwardly disposed present day viewing window is demarcated by a dotted line 100.

The field of view offered by the viewing window assembly 22, as demarcated by the solid line 102, on the other hand, incorporates a significantly increased area, and, if one chose to further incorporate a fresnel lens on a forward portion of the outer panel 34 of the viewing window assembly 22, the forward field of vision would be increased, once again significantly, as indicated by the dashed line 106.

As described above, the truck door system 10 for improved right sided vision of the present invention provides numerous advantages, some of which have been described above, and others of which are inherent in the invention. For example, the dropping glass window is operable to open fully without interfering to any significant degree with the view through the large lower viewing window assembly 22.

Also, modifications to the door assembly 10 may be made without departing from the teachings of the present invention. Accordingly, the scope of the invention is only to be limited as necessitated by the accompanying claims.

I claim:

1. A truck cab door system for increased right side viewing area including:
    a truck cab door having an inner skin panel and an outer skin panel, said panels being spaced apart but joined together along end edges of said panels, said door having a relatively large opening in an upper portion of said door skin panels;
    a glass panel of a dropping glass window assembly received between said skin panels and within and closing off said opening when in a raised position thereof;
    means for supporting said dropping glass window against vertical movement;
    means operatively connected to said window support means for causing selective dropping or raising of said glass panel of said dropping glass window assembly;
    a second, comparably large opening in a lower portion of said door skin panels;
    a window panel fixed within said second opening of said outer skin panel;
    and a clear panel removably mounted over said second opening of said inner skin panel;
    said glass panel of said dropping window assembly passing between said fixed window panel and said clear panel when in a dropped position thereof;
    said means for causing dropping or raising of said glass panel of said dropping glass window assembly being positioned between said inner and outer door skin panels at a hidden location adjacent said large lower opening;
    and said means for supporting said glass panel extending away from said means for causing dropping and raising of said glass panel and under half of said glass panel to a point of attachment thereto.

2. The system of claim 1 wherein said means for causing selective dropping or raising of said glass panel of said dropping window assembly is a reversible motor.

3. The system of claim 2 wherein said reversible motor is operatively engaged to said dropping window assembly by means of a cable drive assembly.

4. The system of claim 2 wherein said reversible motor is operatively engaged to said dropping window assembly by means of a tape drive assembly.

5. The system of claim 1 wherein said dropping window assembly includes a vertical run channel extending downwardly from a forward upper end position within which one side edge of said glass panel is received and travels vertically.

6. The system of claim 1 further including an interior trim panel sized and configured to be fixed over said lower portion of said inner skin panel.

7. The system of claim 6 wherein said interior trim panel includes an opening corresponding to the lower opening in the inner skin panel.

8. The system of claim 7 further including a clear plastic panel which is sized and configured to engage within the opening in the interior panel in a removable manner.

9. The system of claim 8 wherein said clear plastic panel is a snap-in panel.

10. The system of claim 1 further including a vent window located proximate to and movably mounted within an opening in a forward end of said dropping window assembly opening.

* * * * *